UNITED STATES PATENT OFFICE.

ARTHUR GREEN, OF COVENTRY, ENGLAND.

COÖPERATING V SCREW-THREADED ELEMENT.

1,325,669.   Specification of Letters Patent.   Patented Dec. 23, 1919.

No Drawing.   Application filed September 10, 1919.  Serial No. 322,974.

*To all whom it may concern:*

Be it known that I, ARTHUR GREEN, a subject of the King of Great Britain and Ireland, and residing at "Wilga," Warwick avenue, Coventry, in the county of Warwick, England, have invented certain new and useful Improvements in and Relating to Coöperating V Screw - Threaded Elements, of which the following is a specification.

This invention relates to coöperating V-shaped screw-threaded male and female elements such as, for example, bolts and nuts. It is of great importance that these elements as produced by the manufacturers should possess complete interchangeability together with a definite quality of fit when made in standard sizes, and that this interchangeability and definite quality of fit should be independent of the producing factory, provided the standard of workmanship is the same. Methods of meeting this well-known desideratum have long been the subject of discussion and research, and at the present time the best information available to manufacturers is contained in the published reports numbers 20 and 38 issued by the Engineering Standards Committee.

Now following the tables of standards therein laid down, and fully complying with the requirements as to allowances and permissible tolerances, bolts for example may be produced, some of which will be slack in nuts produced under the same conditions, and others will not engage therewith, but will jam thereon after a certain number of engagements are effected. These requirements therefore clearly do not enable real interchangeability together with a definite quality of fit to be secured in all cases.

The object of the present invention is to enable complete interchangeability, together with a definite quality or accuracy of fit, to be secured by a simple and convenient method of manufacture.

I have found that assuming there is no angle error certainty of interchangeability together with a specified quality or accuracy of fit is secured by determining, in relation to the number of turns of thread engagements the allowances essential to compensate for pitch error.

My invention consists in securing certainty of interchangeability, with any definite quality or accuracy of fit up to a predetermined number of engagements, by providing an allowance between the effective diameters of the elements which is arrived at by adding to or subtracting from the normal or ideal effective diameters (as the case may be) a quantity obtained by multiplying together the three following quantities (1) the permissible pitch error $e$ per thread (2) a quantity dependent on the thread angle $a$ (3) the number of turns of thread engagements $n$—thus compensating the effect of pitch error. The allowance, so arrived at is then increased by the allowance required to compensate for angle error (if any). This last mentioned allowance does not depend on the number of engagements and may be calculated in a known way. That is to say, in accordance with my invention, allowance to compensate for pitch error alone should be $n \cdot e \cdot \cot \frac{a}{2}$ and the usual allowance to compensate for angle error should be added thereto.

In order to more completely describe and ascertain the present invention and distinguish it clearly from the prior state of the art, I now proceed to define some of the expressions used in making and gaging screws, and to briefly describe the procedure hitherto recommended for achieving the long sought desideratum of interchangeability combined with a definite quality or accuracy of fit.

A screw is specified by three elements, viz: its diameter, pitch, and form of thread section. When such three elements are specified the "denomination" of the screw is given. The "nominal diameter" of a screw, that from which the screw is named, is approximately the same as the "full diameter". The "full diameter" is accurately defined as that of the larger cylinder which touches the screw thread; the "core diameter" that of the smaller cylinder which touches the screw thread male or female as the case may be.

In measuring any gaging screws to test accuracy and to insure interchangeability the "effective diameter" is the most convenient to test. The "effective diameter" may be defined as that of a co-axial cylinder intersecting the threads at such radius that the width of the thread sections is equal to the width of the spaces between the threads.

If a number of bolts and nuts of the same denomination are all made with absolute accuracy, any bolt and any nut being taken and screwed one on the other will touch each other at all parts of the surface throughout the total axial length of engagement. Such bolts and nuts may be said to be made with "ideal screw surfaces." But in order to compensate for small errors which may be permitted or "tolerated" on (i) the pitch of the thread and (ii) the angle of the thread, a certain difference or clearance is specified between the diameters of the male screw of greatest diameter permitted and that of the female screw of least diameter permitted. Such specified difference is called an "allowance," and any small error permitted is called a "tolerance."

When in order to compensate for errors on the pitch and angle, any allowance is specified between the effective diameters of bolts and nuts of the same denomination, and when such errors happen to be exactly of the same magnitude and sense in a bolt and nut mailed together, there will be a slackness or fit corresponding to the allowance. At the other extreme when such errors happen to be of the full magnitude tolerated but of opposite sense, the bolt and nut will be of tight fit when engaged up to the specified number of turns. Both of these extremes and all intermediate fits are of the same "quality" or "accuracy of fit" as herein referred to.

Now in the reports and tables of screw threads issued by the Engineering Standards Committee, certain tolerances of definite amount which must not be exceeded, are specified in respect of the pitch and of the angle. With a pitch error of definite magnitude tolerated throughout, the necessary allowance between the effective diameters of bolt and nut to secure interchangeability must be proportional to the number of turns of thread engagement. But I have found that interchangeability ought to be considered in conjunction with some definite quality or accuracy of fit. If this had been realized when the existing tables were being worked out it would have at once been seen that a series of important dimensions are missing from the tables and without these figures real interchangeability cannot be obtained except by chance. Because of this misunderstanding manufacturers have drifted into ways of dealing with the screw thread problem purely from the figures stated in the existing tables; some of them attach great importance to dimensions which are easily measured or to other features according to their own special ideas. In consequence, a number of manufacturers are working in different directions and there exists at present that lack of uniformity which standardization is intended to remedy with practical failure to secure real interchangeability combined with any definite quality or accuracy of fit.

Manufacturers naturally follow the lines of least resistance and therefore cause all the errors which they do not try to control to fall on the most important parts of the screw thread which should be controlled.

By reason of the existing reports being set out on a false basis a wrong impression has been created, and it is generally known that the average engineer even though he were a skilled screw maker would regard the importance of the screw thread dimensions somewhat in the following order:—

1. The full diameter, because the screw is named from that diameter, and because it is the most easily measured.
2. The diameter, as it affects the strength of the screw.
3. The effective diameter, which is required for the purpose of fit.
4. The pitch, which may have some slight attention paid to it.
5. The angle, which is totally disregarded, so long as it is somewhat near the specified value.

I find that this order should practically be reversed; and moreover, the various measurements must be taken in conjunction with the number of thread engagements required. Further, when considering tolerances it is necessary to fix attention on the point aimed at:—interchangeability together with a definite quality or accuracy of fit.

After many years' consideration of this matter, I have come to the conclusion that interchangeability or the quality of fit can be most conveniently expressed by the number of threads which will engage in a gage made to the normal dimensions without jamming. If 5 be taken as the lowest number of threads in engagement that are used in engineering practice, (as for instance would be the case in a $\frac{1}{2}''$ British standard Whitworth bolt and nut) I have found that for increased engagements, 8, 10, 12, 14, 16, etc., threads increasing accuracy is required. In other words decreasing tolerances on pitch and angle with a corresponding decreasing allowance on the effective diameter are necessary for obtaining a better quality of fit as the number of engagements is increased.

The various measurements should be grouped in the following manner for the purpose of arranging the allowances and tolerances which can be given.

Group A.

Pitch and angle. These dimensions are of primary importance and should be considered first. The tolerances permitted on these regulate the allowance to be made from the normal effective diameter having regard to the number of threads in engagement.

Group B.

Effective diameter in relation to number of threads in engagement. This is a fluctuating dimension governed by the accuracy or inaccuracy of pitch and angle. The effective diameters should vary with the number of engagements and their values should be given in the table.

Group C.

Core diameter and full diameter. These are of minor importance and so long as a slight clearance is given, these dimensions do not affect either fit or interchangeability.

The importance of my method of grouping will be realized when it is understood that it is possible to vary the angle without affecting the pitch, and conversely to vary the pitch without affecting the angle. But no variation can be allowed in the pitch or angle without a compensating allowance from the normal effective diameter, if the thread is to be interchangeable with a correct reference gage.

The effective diameter required for any screw cannot be given in tables for fixed figures. It must always be calculated for a given number of pitch engagements in conjunction with the tolerances permitted on pitch and angle. Hitherto the trouble experienced in obtaining interchangeability coupled with a definite quality or accuracy of fit is brought about entirely by the non-appreciation of the above facts.

The advantages of grading screw work on the number of threads in engagement are that it allows both fine and coarse work to be tested with correct gages. Further a manufacturer can decide to select the limits on which he desires to manufacture his bolts and nuts, or the user can specify the quality or degree of accuracy of fit or the degree of interchangeability he requires, by specifying the number of pitch engagements. For bolts and nuts for screwing together rough wrought iron work 5 engagements may be ample; whereas for other engineering purposes engagements from 6 to 12 may be required. Turnbuckles and similar screws used for aircraft are exceptional cases, in which 16 thread engagements or more may be considered necessary.

For a screw of any given denomination, a table can be compiled showing the necessary allowance on effective diameter to compensate, in accordance with my invention, for errors of various amounts in pitch and angle respectively and showing the qualities of fit attainable with different numbers of engagements. This table will show the limits of pitch, angle and effective diameters of the male and female screws, in direct relation to the number of turns of thread engagement. I append herewith an example of such a table, which is for a ½ inch British standard fine screw, the ideal elements of which are specified as follows:—Full diameter .5000"; angle 55°; pitch .06250 (16 threads per inch).

| Pitch engagement. | Normal pitch: 16 threads per inch = .06250" pitch. | | | | | | Male. | | | Female. | | |
|---|---|---|---|---|---|---|---|---|---|---|---|---|
| | | | | | | | Full diameter. | | | Full diameter. | | |
| | | | | | | | Max. | Tol. | Min. | Max. | Tol. | Min. |
| | | | | | | | .5000 | .003 | .4970 | .5060 | .003 | .5030 |
| | The dimensions for pitch and angle are common to both male and female threads. | | | | | | Core diameter. | | | Core diameter. | | |
| | | | | | | | Max. | Tol. | Min. | Max. | Tol. | Min. |
| | | | | | | | .4170 | .003 | .4140 | .4230 | .003 | .4200 |
| | ½ angle. | | | Pitch. | | | Effective diameter. | | | Effective diameter. | | |
| | Max. | Tol. | Min. | Max. | Tol. | Min. | Max. | Tol. | Min. | Max. | Tol. | Min. |
| | | | | In. | In. | In. | In. | In. | In. | In. | In. | In. |
| 5 | 29°–45′ | 2°–15′ | 27°–30′ | .06272 | .00044 | .06228 | .4555 | .0020 | .4535 | .4664 | .0020 | .4644 |
| 6 | 29°–37½′ | 2°– 7½′ | 27°–30′ | .06268 | .00036 | .06232 | .4557 | .0020 | .4537 | .4663 | .0020 | .4643 |
| 7 | 29°–30′ | 2°– 0′ | 27°–30′ | .06265 | .00030 | .06235 | .4558 | .0020 | .4538 | .4662 | .0020 | .4642 |
| 8 | 29°–22½′ | 1°–52½′ | 27°–30′ | .06263 | .00026 | .06237 | .4559 | .0020 | .4539 | .4660 | .0020 | .4640 |
| 9 | 29°–15′ | 1°–45′ | 27°–30′ | .06261 | .00022 | .06239 | .4561 | .0015 | .4546 | .4654 | .0015 | .4639 |
| 10 | 29°– 7½′ | 1°–37½′ | 27°–30′ | .06260 | .00020 | .06240 | .4562 | .0015 | .4547 | .4652 | .0015 | .4637 |
| 11 | 29°– 0′ | 1°–30′ | 27°–30′ | .06259 | .00018 | .06241 | .4564 | .0015 | .4549 | .4651 | .0015 | .4636 |
| 12 | 28°–52½′ | 1°–22½′ | 27°–30′ | .06258 | .00016 | .06242 | .4566 | .0010 | .4556 | .4644 | .0010 | .4634 |
| 13 | 28°–45′ | 1°–15′ | 27°–30′ | .06257 | .00014 | .06243 | .4568 | .0010 | .4558 | .4642 | .0010 | .4632 |
| 14 | 28°–37½′ | 1°– 7½′ | 27°–30′ | .06256 | .00012 | .06244 | .4571 | .0010 | .4561 | .4639 | .0010 | .4629 |
| 15 | 28°–30′ | 1°– 0′ | 27°–30′ | .06255 | .00010 | .06245 | .4574 | .0010 | .4564 | .4636 | .0010 | .4626 |
| 16 | 28°–22½′ | 0°–52½′ | 27°–30′ | .06254 | .00008 | .06246 | .4577 | .0005 | .4572 | .4628 | .0005 | .4623 |
| 17 | 28°–15′ | 0°–45′ | 27°–30′ | .06253 | .00006 | .06247 | .4581 | .0005 | .4576 | .4624 | .0005 | .4619 |
| 18 | 28°– 0′ | 0°–30′ | 27°–30′ | .06252 | .00004 | .06248 | .4587 | .0005 | .4582 | .4618 | .0005 | .4613 |
| 19 | 27°–45′ | 0°–15′ | 27°–30′ | .06251 | .00002 | .06249 | .4593 | .0005 | .4588 | .4612 | .0005 | .4607 |

The first column headed "pitch engagement" shows the minimum number of threads up to which screws will be interchangeable if constructed within the dimensions given on the line opposite any such number. The half angle column shows the permissible tolerance from the normal half angle. The pitch column gives the permissible tolerance above and below the normal pitch. The pitch values are expressed per thread which has been found to be more convenient than expressing the pitch error as per inch or per entire length of thread engagement. The tolerances for angle and pitch errors are the same for both male and female threads. The column headed "effective diameter" is arranged in such a manner that the maximum figure permissible for the male or the minimum permissible for the female will absorb the total errors permitted on the angle and pitch given for any particular number of engagements.

The tolerances given in the various columns have been selected to suit the limits within which it is found that manufacture can be satisfactorily carried on. They have been arranged to decrease as the number of engagements increases, which causes the effective diameter to approach nearer the normal dimensions. This, it will be observed, allows complete interchangeability of all classes of work within the number of engagements indicated. It also allows work to be specified according to the quality of fit desired. The quality of fit corresponds to the number of engagements.

The table may be graded into three qualities of fit, 5 to 9 engagements being ordinary quality, 10 to 14 engagements medium quality and 15 to 19 engagements superior quality, and by this method the manufacturer may select the limits suited best for his method of manufacture or the user can specify the class of fit desired.

For example, from the table it will be seen that the greatest diametral slackness between a bolt and a nut each selected at random from batches suitable for 5 engagements (ordinary quality) will be .0129 inch with a permissible tolerance of 4.5° on the thread angle, .00044 inch on the pitch and .0020 effective diameters of bolt and nut. For 10 engagements (medium quality), the greatest diametral slackness will be .0105 inch, with a permissible tolerance of 3.25° on the thread angle, .00020 inch on the pitch, and .0015 on the effective diameters. For 15 engagements (superior quality), the greatest diametral slackness will be .0072 inch with permissible tolerance of 2.0° on the thread angle, .00010 inch on the pitch, and .0010 inch on the effective diameters.

With regard to selecting limits upon which manufacture is to be conducted, it must first be observed that the values of limits are arranged so that errors of various degree can only be permitted to exist together. In stating the number of engagements indicating the interchangeability, the larger error existing, whether it be pitch or angle, should be taken, and the effective diameters must be made within the limits corresponding to that number in the table.

Although when screws are made within the limits corresponding to any tabulated engagement number, that number, as above stated, indicates both the interchangeability and the quality of fit, the table can be used in any case where it is desired to make it easier for the manufacturer to produce screws interchangeable up to a larger number of engagements by making a larger allowance on effective diameters than corresponds to that tabulated number. For example, if the pitch and angle are made within the tabulated limits corresponding to a larger engagement number $a$ and the effective diameters are made within the tabulated limits corresponding to a smaller engagement number $b$, in this case, the interchangeability is indicated by $a$ and the quality of fit by $b$. It is obvious that this procedure cannot be reversed.

Some consideration must be given as to the method to be adopted to bring about the result desired, and experience has shown me that this is best done by adopting a complete system of measuring and grading all tools used for producing work. Taps should be measured after they are finished and marked with the number of engagements they are suited for. This is perfectly safe procedure, as taps properly made can produce female threads of practically the same size as that of the tap if used in a proper manner with the tapping hole of the correct size for the material being tapped and the type of taps used. Screwing dies cannot of course, be measured in the same manner as the taps, but for the purpose of grading, a male test piece should be taken which has been produced under as nearly as possible working conditions. This test piece and the screwing die are marked with the number of engagements the die is suitable for. It may not always be possible to mark the hardened die with the pitch engagement number, in which case the purpose will be served by marking the test piece and attaching it in a suitable manner to the die it refers to for the purpose of acting as a guide to the user of the die. By adopting this method of using taps and screwing dies which have been tested and classified, it will be found that the necessity for gaging the work produced can be reduced to a minimum. Further, a convenient method is put into the hands of the user of being able to select the taps and dies which will produce the work in accordance with the specified requirements.

It is a wide-spread opinion that screw manufacturers cannot work to close limits. This opinion is apparently justified when a comparison is made between batches of work from different tools, and more so, when one manufacturer's product is compared with another. Such products are, in fact, not generally interchangeable with any definite accuracy of fit. If however a comparison is made of work which all comes from the same set of tools which have been carefully set in the machines, it will be found that there is very little variation during the process of production. It is possible with tools properly set and kept reasonably sharp in order to prevent distortion of pitch and broken threads, to produce screws within very fine limits without difficulty, except for a slight wearing down of the corners of the crest which does not make the slightest difference to the fit of the screws when the proper clearance has been allowed. The want of interchangeability arises from the present faulty methods of defining the limits of accuracy of the essential elements of the thread. In manufacturing threaded elements according to the present invention therefore, interchangeability combined with the required "grade" or accuracy of fit is obtained while permitting the largest tolerances of pitch and angle errors consistent with the conditions specified, the said tolerance on pitch error varying inversely with the specified number of engagements. By providing the largest tolerances consistent with the required grade of fit, in each case, the manufacturing operations are expedited, stoppages for adjustment of tools and the like being reduced to the minimum.

Having now described my invention, what I claim as new and desire to secure by Letters Patent is:—

1. The manufacture of coöperating V-shaped screw elements of a given denomination made interchangeable up to a specified number of turns of thread engagement, by compensating the effect of pitch error by an allowance between the effective diameters of the said elements at least equal to the product $n.e.\cot\frac{a}{2}$ where $n$ is the specified number of turns of thread engagement, $e$ is the pitch error and $a$ is the thread angle, substantially as described.

2. The manufacture of coöperating V-shaped screw elements of a given denomination made interchangeable up to a specified number of turns of thread engagement and possessed of the greatest accuracy of fit consistent with the errors tolerated, by providing an allowance between the effective diameters of the said elements made up of the allowance $n.e.\cot\frac{a}{2}$ mentioned in the preceding claim, which allowance compensates for the pitch error, and the additional allowance required to compensate for the angle error tolerated, which last mentioned allowance is independent of the number of turns of thread engagement, and may be calculated in a known way.

3. V-shaped male and female screw elements which have been constructed with the allowance mentioned in claim 1 for the purpose hereinbefore set forth.

In testimony whereof I have signed my name to this specification.

ARTHUR GREEN.